(12) United States Patent
Barrows

(10) Patent No.: US 9,690,120 B1
(45) Date of Patent: Jun. 27, 2017

(54) CLIP-IN PRESCRIPTION EYEWEAR

(71) Applicant: Andrew Barrows, Maple Grove, MN (US)

(72) Inventor: Andrew Barrows, Maple Grove, MN (US)

(*) Notice: Subject to any disclaimer, the term of this patent is extended or adjusted under 35 U.S.C. 154(b) by 0 days.

(21) Appl. No.: 14/943,688

(22) Filed: Nov. 17, 2015

Related U.S. Application Data

(60) Provisional application No. 62/080,509, filed on Nov. 17, 2014.

(51) Int. Cl.
*G02C 7/08* (2006.01)
*G02C 9/04* (2006.01)

(52) U.S. Cl.
CPC .......... *G02C 9/04* (2013.01); *G02C 7/08* (2013.01)

(58) Field of Classification Search
CPC .......... G02C 7/08; G02C 7/086; G02C 7/088; G02C 9/00; G02C 9/02; G02C 9/04; G02C 2200/10
USPC ........................................ 351/47, 48, 57, 58
See application file for complete search history.

(56) References Cited

U.S. PATENT DOCUMENTS

| 5,790,230 | A | 8/1998 | Sved | |
|---|---|---|---|---|
| 5,917,574 | A * | 6/1999 | Chang | G02C 9/00 |
| | | | | 351/159.6 |
| 6,244,705 | B1 | 6/2001 | Ledbetter et al. | |
| 6,371,612 | B1 | 4/2002 | Barrows | |
| 6,450,637 | B1 | 9/2002 | Zelman | |
| 6,502,937 | B2 | 1/2003 | Yang | |
| 6,938,277 | B2 | 9/2005 | Lindahl | |
| 7,055,951 | B2 | 6/2006 | Canavan et al. | |
| D543,577 | S | 5/2007 | Lennox | |
| D543,578 | S | 5/2007 | Lennox | |
| D544,025 | S | 6/2007 | Lennox | |
| 7,458,679 | B2 * | 12/2008 | Lennox | G02C 5/06 |
| | | | | 351/47 |
| 7,594,280 | B2 | 9/2009 | Lindahl | |
| 2003/0206268 | A1 * | 11/2003 | Krumme | G02C 1/02 |
| | | | | 351/110 |
| 2010/0177274 | A1 * | 7/2010 | Begg | G02C 1/04 |
| | | | | 351/57 |

FOREIGN PATENT DOCUMENTS

DE 10004225 * 5/2002 ......... G02C 2200/10

* cited by examiner

*Primary Examiner* — Huy K Mai
(74) *Attorney, Agent, or Firm* — Eggink & Eggink; Anthony G. Eggink; Katrina M. Eggink

(57) ABSTRACT

An adjustable clip-in prescription lens insert assembly for wrap around style frames used in industrial, construction, recreational activities and in the medical arts. The clip-in prescription lens insert assembly has an adjustable and pliable brow bar structure and adjustable and pliable clip members to form and fix the prescription lens insert into wrap around style frames. The brow bar and clip member structures are mounted in connector tubes fixed to the lens frames of the lens and insert assembly and are preferably constructed of a metal or metal alloy having shape memory properties.

20 Claims, 6 Drawing Sheets

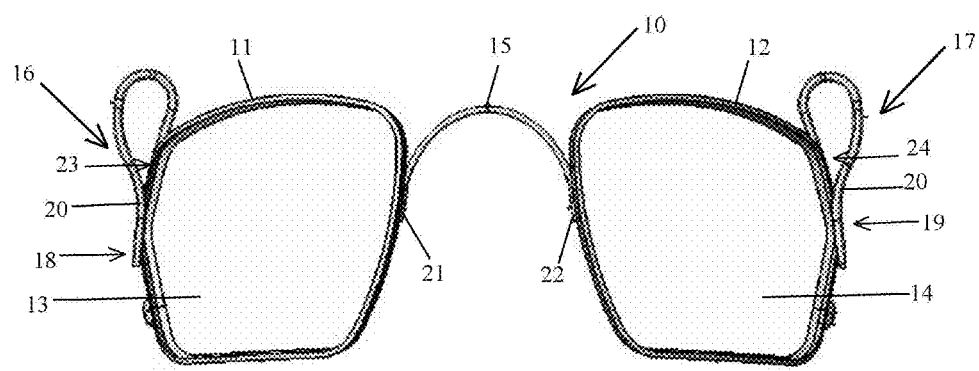
FIG 1
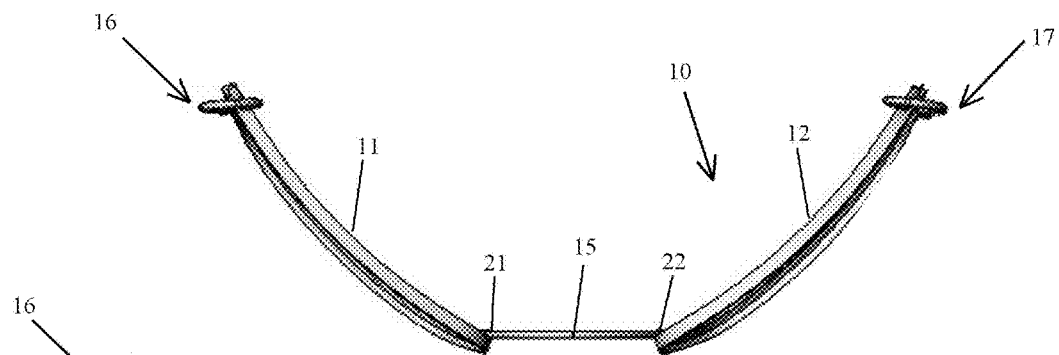
FIG 2
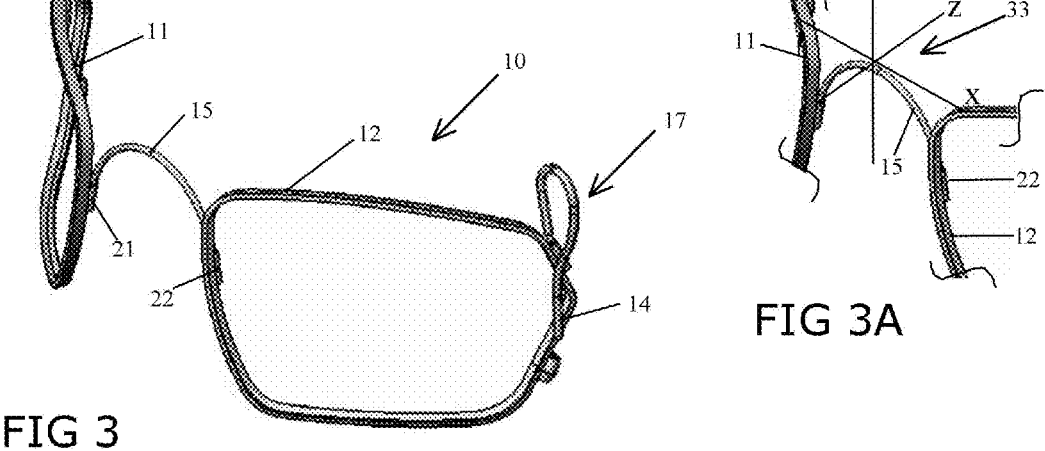
FIG 3
FIG 3A

CLIP-IN PRESCRIPTION EYEWEAR

This application claims the benefit of U.S. Provisional Application Ser. No. 62/080,509, flied Nov. 17, 2014, and is fully incorporated by reference herein.

BACKGROUND OF THE INVENTION

The present invention relates generally to clip-in prescription lenses for eyewear. Particularly the invention relates to adjustable clip-in prescription lenses for use in a variety of wrap around style eyewear and other styles of eyewear. More particularly, the invention relates to a universally fitting clip-in prescription lens assembly for use in wrap around eyewear, such as sunglasses, safety eyewear, hunting eyewear, medical eyewear, industrial eyewear, 3D viewing eyewear, Google® glasses and the like.

The use of wrap around style eyewear is prevalent in safety and medical related areas as well as for active life styles to protect the side of the wearer's face. For example, safety glasses are common in the industrial and construction trades, in the medical arts, i.e., dental and in use with laser equipment and when engaging in active life styles such as skiing, motor sports and the like. However, the use of wrap around eyewear is limited to those not requiring corrective vision, such as prescription eyeglasses. To overcome this limitation, the providers of the wrap around eyewear may also provide prescription inserts which are configured to be used with the particular eyewear structures provided. For example, magnetic structures and specifically formed inserts have been proposed for use with specified wrap around eyewear. These inserts, however, are costly and inherently limited in use. Although prescription eyewear insert assemblies have been used and proposed in the past, i.e., assemblies having biasing means and having exteriorly positioned clips, these insert assemblies are not suitable for use in wrap around frames. To overcome these limitations and shortcomings, the clip-in prescription eyewear assembly of the present invention provides a universal adjustable structure for use in a variety of wrap around and other eyewear configurations.

SUMMARY OF THE INVENTION

An adjustable clip-in prescription lens insert assembly for wrap around eyewear. The clip-in prescription lens assembly comprises a frame structure having a pair of lens frame members for holding a pair of prescription lenses correcting the vision of the user. The lens frame members may have a predetermined configuration to fit within a specified wrap around frame structure. The corrective lenses may include prescriptions for reading purposes, for example. Each lens frame member has a top portion, an inner and an outer frame portion. A deformable brow bar having a predetermined configuration is fixed at its terminal ends within connector tubes mounted to the inner frame portions of each lens frame member. An adjustable clip or hook member is fixed to and extends from the top portion of each lens frame member and are preferably mounted within connector tubes fixed to the outside of the respective lens frame members. The connector tubes fixed to the inside and outside peripheries of the lens frame members are provided to properly position and to distribute forces on the connections of the brow bar and clip hook members when the insert assembly is mounted within the wrap around frame for use. The adjustable clip has a formed terminal end and the adjustable clip is preferably coated with a silicone coating or a polymeric sleeve, for example.

The adjustable brow bar structure and the adjustable clip members are preferably comprised of a deformable metal or metal alloy and having shape memory and elastic properties such as titanium or a titanium alloy, i.e., a nickel/titanium alloy. The configuration of the adjustable brow bar may be a bow-shaped configuration which allows the brow bar to be adjusted and having three degrees of freedom (x, y, z axes) so that the lenses of the insert assembly may be adjusted in all directions, i.e., in horizontal and rotational directions to thereby conform the clip-in insert assembly with respect to the internal shape of the lens or lenses and the configuration of the wrap around style frames. The insert assembly is preferable a curved structure to provide a spring like or elastic force to the insert assembly when the clip members are secured over the brow bar of the wrap around frames. The frames and connector tubes may be formed of a metallic composition, such as stainless steel, for example.

The adjustable clip members are generally hook-shaped structures, each having an upwardly extending curved loop portion and an outwardly sloping terminal end. The clip members are deformable to accommodate the thickness of the brow of the wrap around frame within the curved loop portion of the clip members. The deformable adjustability of the brow bar structure and clip members permits a user to secure the clip-in prescription lens structure to the inside of the wrap around style and other style frames for use in industrial, sporting and medical settings.

An advantage of the adjustable clip-in prescription insert assembly of the invention is to provide an economical, easy to use prescription lens structure, adaptable for any wrap around style frame design.

Another advantage of the invention is to provide prescription eyeglass inserts that have a pliable and deformable brow bridge and clip members each having shape memory and elastic properties that are adjustable to fit into wrap around frames, for example, 4, 6 and 8 base frames.

These and other advantages of this invention will become clear from the following description by reference to the drawings.

BRIEF DESCRIPTION OF THE DRAWINGS

FIG. 1 is a frontal view of the adjustable clip-in prescription insert assembly of the invention;

FIG. 2 is a top view of the adjustable clip-in prescription insert assembly;

FIG. 3 is a perspective view thereof;

FIG. 3A is a perspective view showing the brow bridge of the adjustable insert assembly of FIGS. 1-3;

DESCRIPTION OF THE PREFERRED EMBODIMENTS

Figure 4:
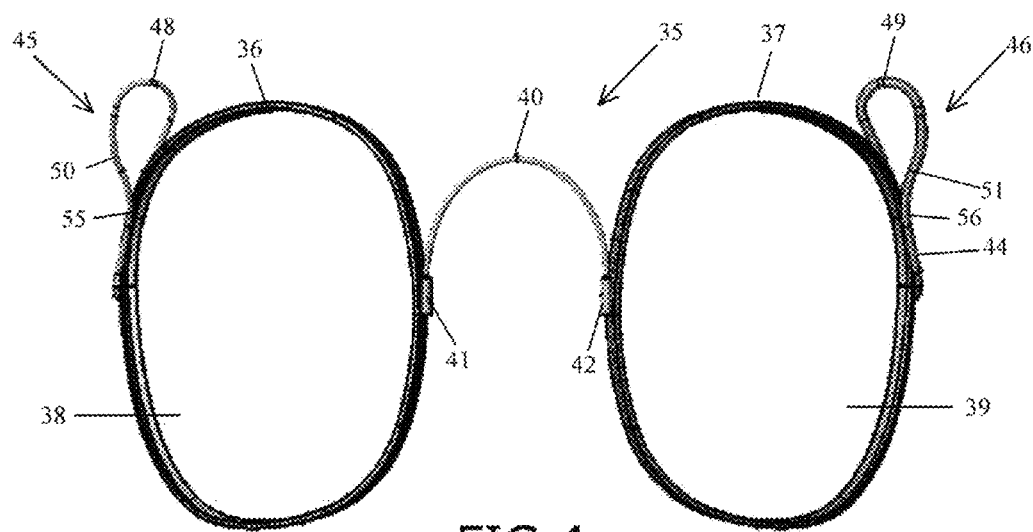
FIG. 4 is a frontal view of the clip-in prescription lens insert assembly of the invention having round lens frames.

Referring to FIGS. 1-3A, the adjustable clip-in prescription lens insert assembly 10 is shown having a lens frame 11 and a lens frame 12. Prescription lenses 13 and 14 correcting the vision of the user are shown held within lens frames 11 and 12, respectively. Adjustable brow bar 15 is shown connected at its terminal ends to the inside of lens frames 11 and 12 by means of connector tubes 21 and 22, respectively. The terminal ends of the brow bar 15 may be held within the connector tubes 21, 22 by means of crimping and/or the utilization of an adhesive. The connector tubes may be mounted to the lens frames 11 and 12 via welding or the like. The lens frame structures and connector tubes may be formed of a stainless steel composition, for example. The brow bar 15 is preferably constructed of a pliable, deformable metal composition having shape memory and elastic properties such as titanium, a titanium alloy or the like. The brow bar 15 is shown to have a bow-like configuration for adjustment with respect to the nose bridge of the wrap around frame. The brow bar 15 configuration is exemplary and may be comprised of other shapes. As further discussed below, the configuration, deformability and composition of the brow bar 15 allows the user to adjust the shape of the insert assembly 10 into a multiplicity of configurations to provide a universal fit for wrap around frames. The top view of insert assembly 10 of FIG. 2 shows the lens frames 11 and 12 to be in an angled relationship with respect to each other and the brow bar 15 so as to provide a spring like force when mounted to wrap around frames as further discussed below.

FIGS. 1-3A further show lens frames 11 and 12, respectively, to have hook-shaped adjustable clip members 16 and 17 fixed thereto at generally the outside top portions thereof. The terminal ends of the clip members 16 and 17 are shown mounted within connector tubes 23 and 24, respectively, and are held therein as described above with respect to the brow bar 15. The connector tubes 23 and 24 provide for force distribution and provide for the predetermined positioning of the clip members 16 and 17. The clip members 16 and 17 are further shown to have sloped terminal ends 18 and 19 which aid in the forming and installation process of the clip-in insert assembly 10 to the inside of the wrap around frames, for example. The clip members 16 and 17 are preferably also constructed of a deformable metal or alloy having shape memory and elastic characteristics. The clip members are preferably coated with a coating or a polymeric sleeve such as a silicone coating or like composition so as to protect the lenses of the wrap around frames. The clip members 16 and 17 may be spread out for adjustment to fit the size of the wrap around frame brow, i.e., the thickness, for example. As shown particularly in FIGS. 2 and 3, the clip-in insert assembly has an arcuate or curved shape, which provide a spring-like action or tension when mounted to the inside of the wrap around frames, as further discussed below.

Referring further to FIG. 3A, a coordinate system 33 having x, y and z axes is shown with respect to the adjustable brow bar 15. The deformability of the composition of the brow bar structure permits the brow bar 15 configuration to have three degrees of freedom to thereby allow deformability along the x, y, and z axes to thereby permit conformance to a multiplicity of wrap around frame nose piece structures as the clip members are positioned over the brow structure of the frame.

Figure 5:
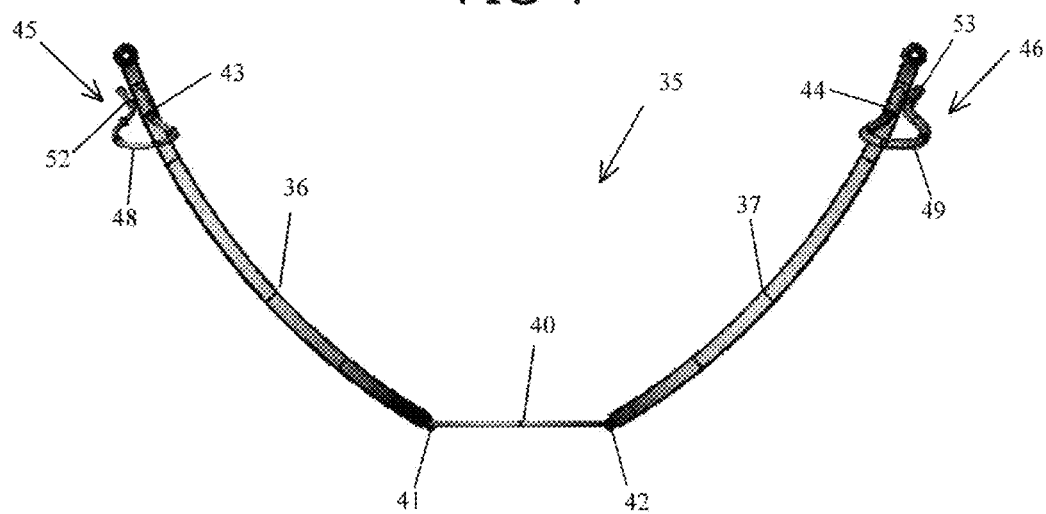
FIG. 5 is a top view of FIG. 4.

Referring to FIGS. 4 and 5, the adjustable clip-in prescription lens insert assembly 35 is shown having lens frames 36 and 37 bolding prescription lenses 38 and 39, respectively, and joined at the respective inner portions of the lens frames by adjustable brow bar 40. The brow bar 40 is shown having a generally bow-like or inverted C-shaped configuration with the terminal leg portions fixed to the inside portions of the lens frames 36 and 37. The inverted C-shaped brow bar 40 has upwardly angled leg portions mounted in connector tubes 41 and 42 and upwardly extending leg portions. The combination of the configuration of the brow bar 40 and the composition of a deformable shape memory and elastic material, such as nitinol (a nickel titanium alloy), for example, allow a user to deform the insert assembly 35 whereby the adjustable brow bar 40 is placed over the nose piece of a desired wrap around frame and to provide the spring like property to the insert assembly.

Figure 6:
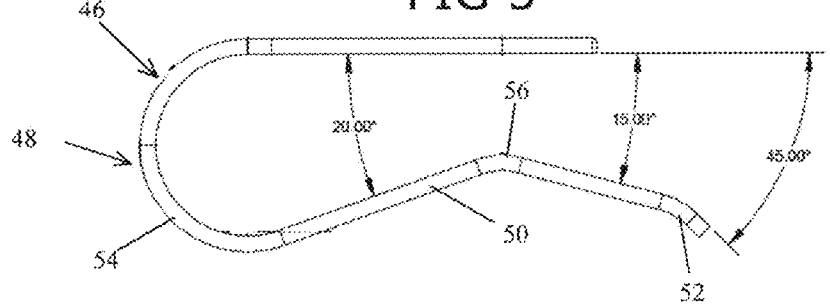
FIG. 6 is an enlarged view of the clip member of the clip-in prescription lens insert assembly.

Referring further to FIGS. 4 and 5, clip members 45 and 46 are shown mounted within connector tubes 43 and 44, respectively, to the outside portions of the lens frames 36 and 37 and are shown to extend upward and outward therefrom so as to position and hold the clip members. The clip members 45 and 46, respectively, have rounded top or loop portions 48 and 49, descending portions 50 and 51, inwardly directed bends 55 and 56 and outwardly extending terminal ends 52 and 53. The enlarged view of the clip member 46 in FIG. 6 shows that the configuration of the clip member allows the adjustable clip members of the prescription inserts to be secured about the top or brow bar of wrap around frame 25, for example, or onto a medical wrap around frame structure. The clip members 45 and 46 are further shown to have a sleeve or coating 54, for example, a silicone, to prevent scratching of the lenses of the wrap around frames.

Referring further to FIG. 6, the hook shaped clip member 46 has a configuration which permits the clip-in insert to be secured within a variety of wrap around and other frame structures. The brow bar fits over the top of the nose piece of the wrap around frame and the hook shaped clips are clipped over the brow bar of the wrap around frame. The curved configuration of the insert frame, when viewed from above, has a sharper curvature than that of the wrap around frame so that the bending of the frame structure causes the brow bar of the insert to be deformed over the nose piece of the wrap around frame and to provide tension. The terminal end of the clip members are shown to extend a substantial distance down the lens frame periphery, the latter providing stability to the insert assembly when mounted within the wraparound frame as shown in FIGS. 7-9, for example.

Figure 7:
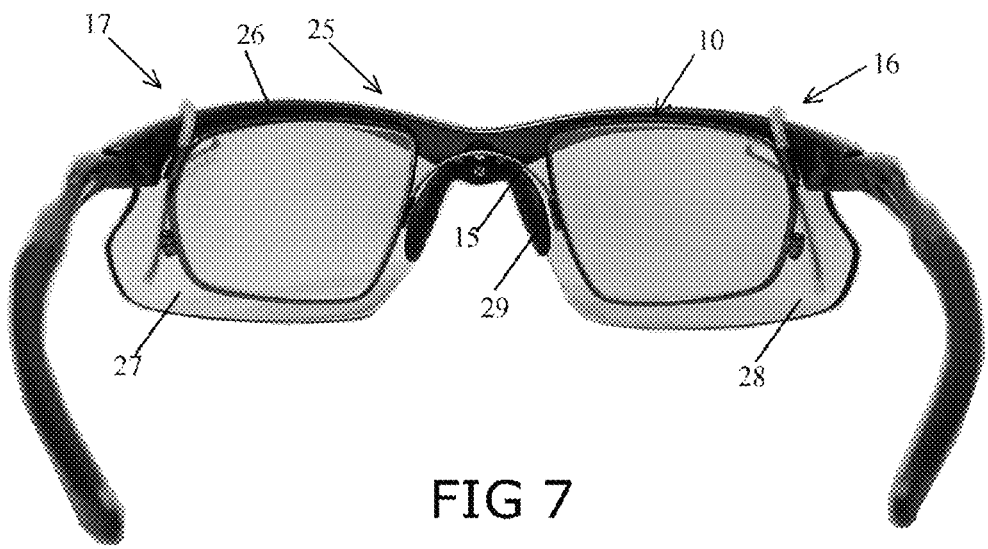
FIG. 7 is a rear view of wrap around safety glasses and showing the clip-in prescription insert assembly mounted therein.
Figure 8:
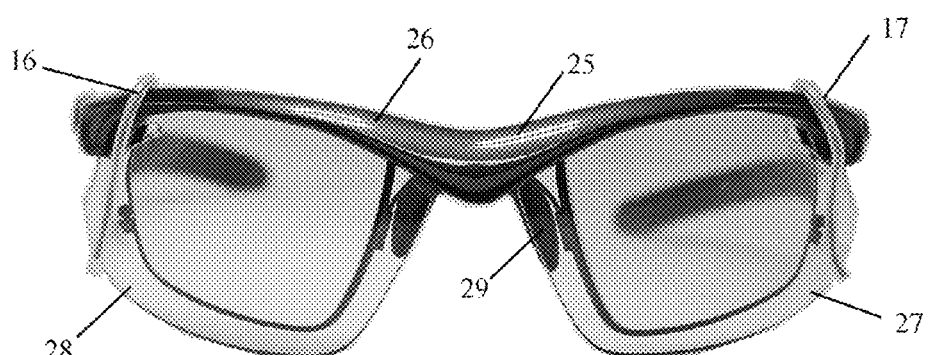
FIG. 8 is a frontal view thereof.
Figure 9:
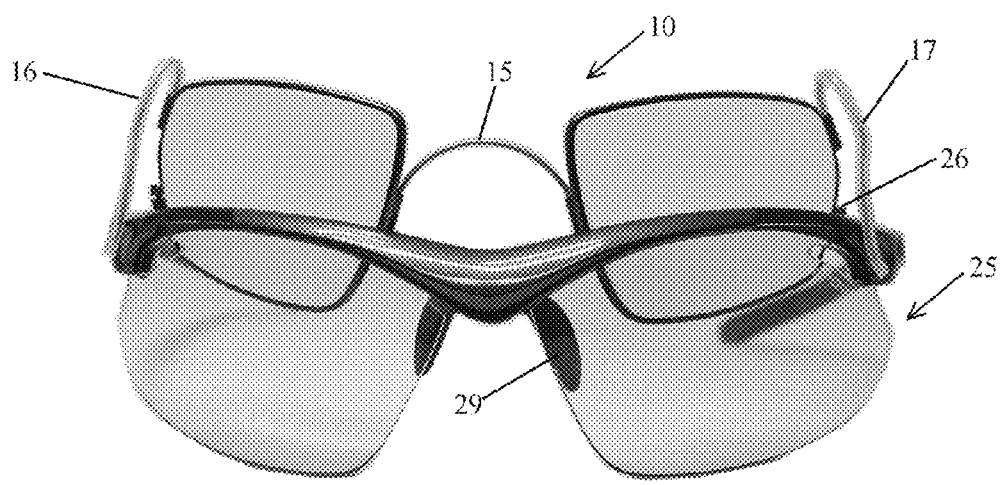
FIG. 9 is a frontal view showing the clip-in prescription insert being placed for use in the wrap around safety glasses of FIGS. 7 and 8.

Referring to FIGS. 7-9, the adjustable clip-in prescription lens insert assembly 10 is shown mounted to the inside of wrap around style frame 25 having a unitary structure with a brow 26, lenses 27 and 28 and nose piece 29. The brow bar 15 of the insert assembly 10 is shown positioned about nose piece 29 of the wrap around style frame 25. Wrap around frames 25 are commonly used for recreational and safety purposes. As shown in FIG. 9, brow bar 15 of the prescription lens insert 10 is being extended over the nose bridge 26 of the frame 25 and clip members 16 and 17 are shown being clamped over the top of the wrap around frame 25. The downward extension of the clip members 16 and 17 and the curved shape of the lens insert assembly provides a spring-like force when clipped and secured within the structure of the wrap around frame 25.

As shown in the drawings, the shape of the generally oval style lens frames 11 and 12 of insert assembly 10 and the shape of the generally circular lens frames 36 and 37 of insert assembly 35 may have a configuration to fit within a particular style of wrap around frame designs, for example, male/female wrap around and male/female fashion 4 and 6 base frames, as known in the art.

Figure 10:
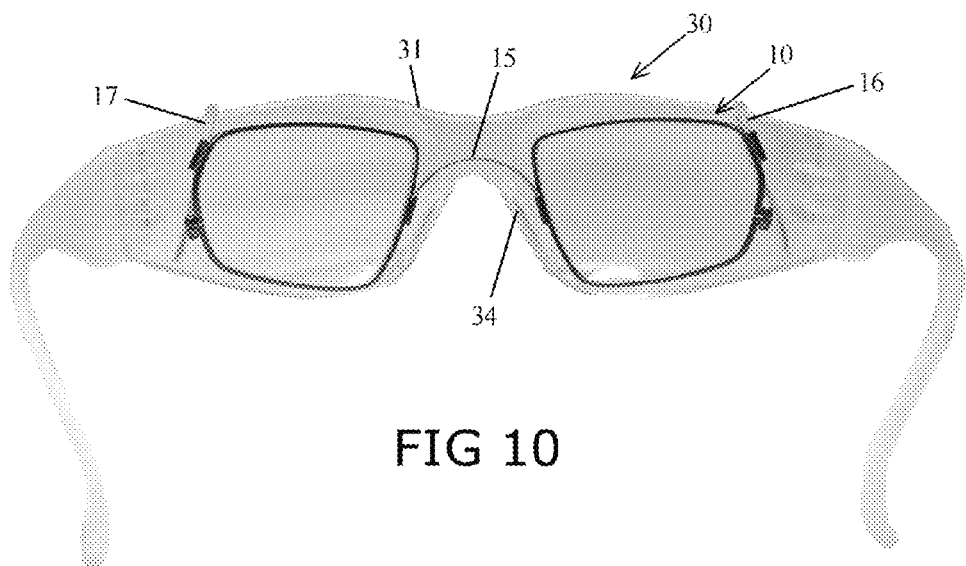
FIG. 10 is a rear view of wrap around safety glasses and having the clip-in prescription insert assembly mounted therein.
Figure 11:
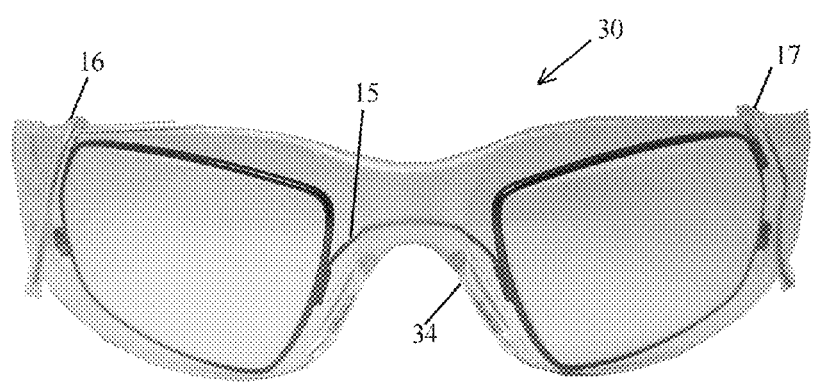
FIG. 11 is a frontal view thereof.
Figure 12:
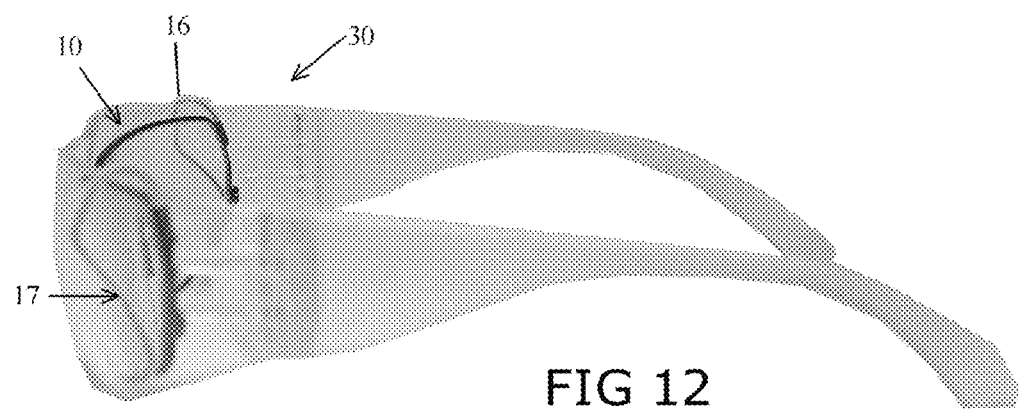
FIG. 12 is a side view thereof.

Referring to FIGS. 10-12, adjustable clip-in prescription lens insert 10 is shown mounted to the inside of wrap around frame 30. As shown, the brow bar 15 of the clip-in insert assembly 10 is formed to contact nose piece 34 of the wrap around frame 30 and clip members 16 and 17 are shown formed around the brow 31 of the frame 30. The frames may have lenses with loupes commonly used in the medical arts.

Figure 13:
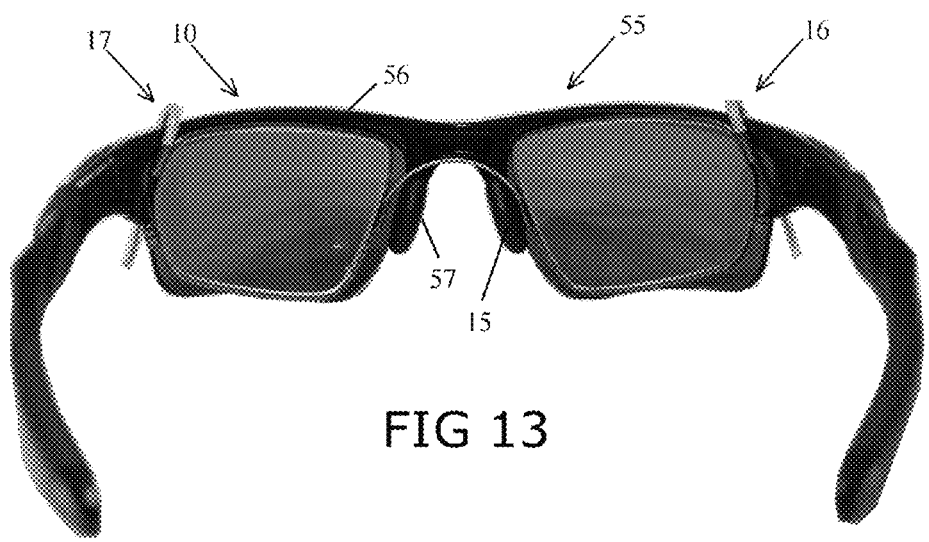
FIG. 13 is a rear view of wrap around sunglasses and having the clip-in prescription insert assembly mounted therein.
Figure 14:
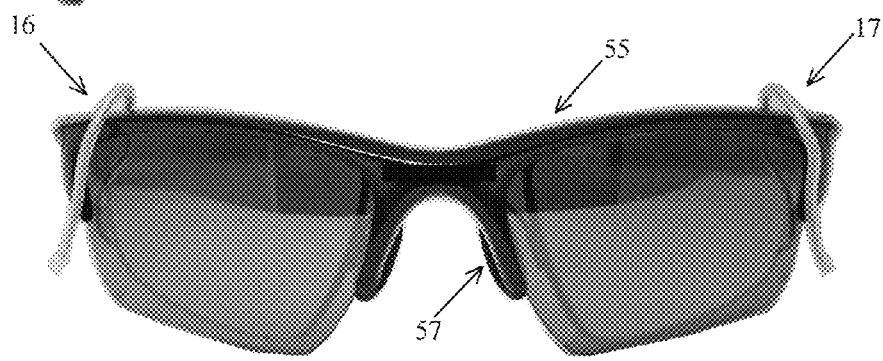
FIG. 14 is a frontal view thereof.
Figure 15:
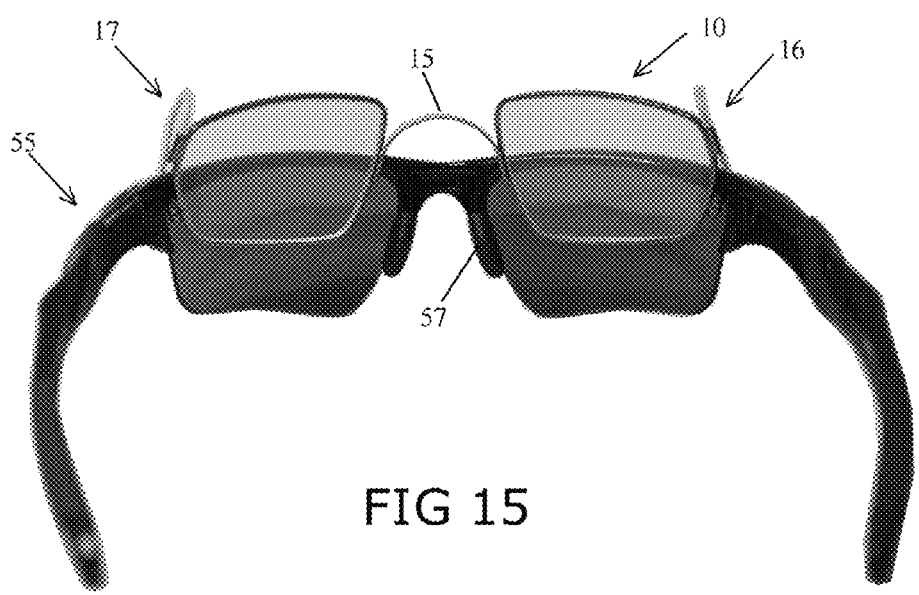
FIG. 15 is a rear view showing the clip-in prescription insert assembly being placed for use in the wrap around sunglasses of FIGS. 13 and 14.
Figure 16:
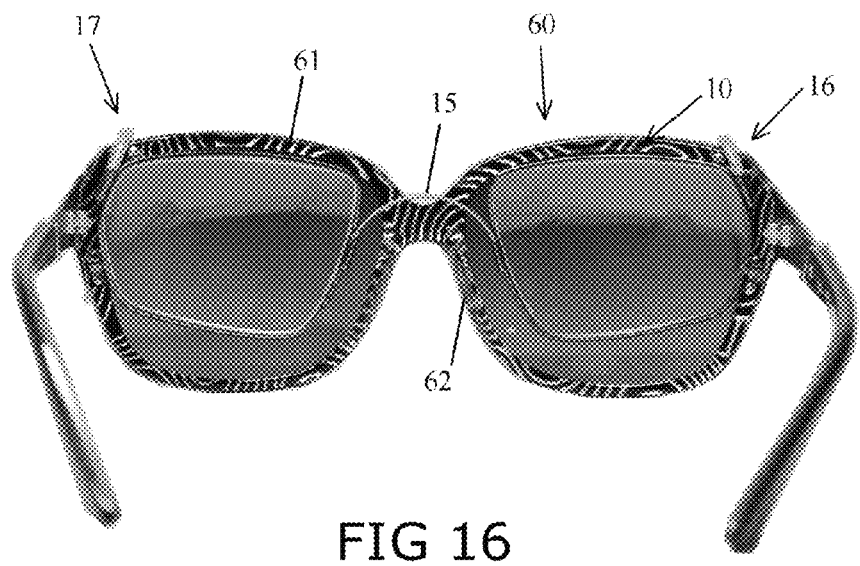
FIG. 16 is a rear view of sunglasses and having the clip-in prescription insert assembly mounted therein.
Figure 17:
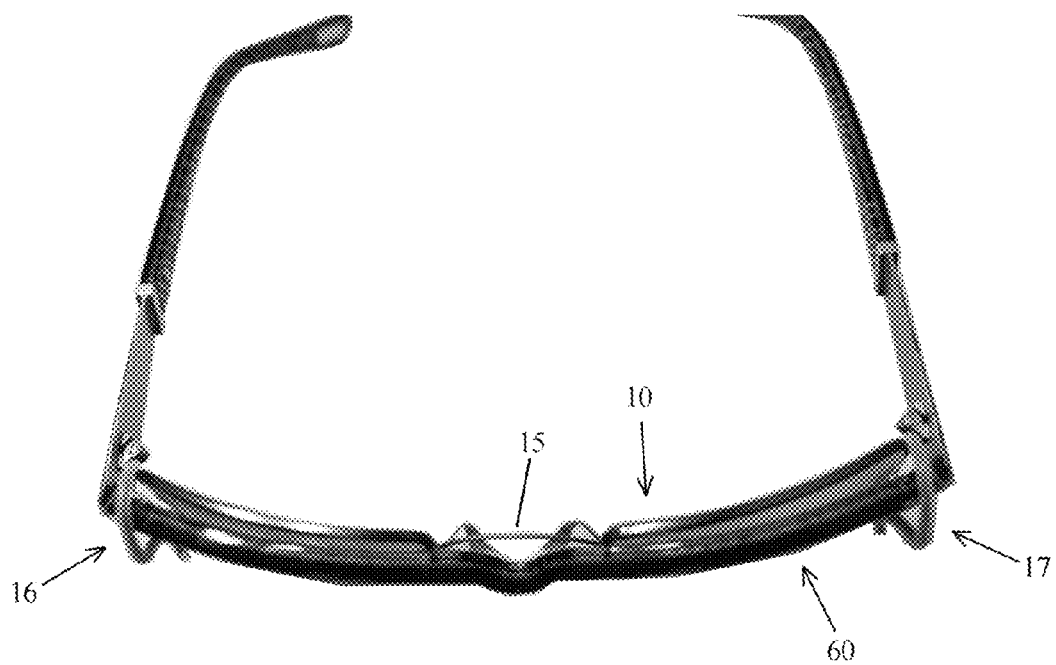
FIG. 17 is a top view thereof.

FIGS. 13-15 show the adjustable clip-in prescription lens insert assembly 10 held within sunglasses 55 having brow 56 and nose piece 57. FIGS. 16-17 show the insert assembly 10 mounted within sunglasses 60 having brow 61 and nose piece 62. The adjustable clip-in assemblies of the invention are constructed to fit within a range of wrap around and other frame styles having different nose pieces and curvatures. For example, for use in male/female fashion 4 and 6 base frames and providing tighter tension for relatively small brow bar structures and looser tension in foam backed frames.

The adjustable clip-in prescription insert assemblies 10 and 35 are shown having a brow bar with lens frames mounted thereto by means of connector tubes 21, 22 and 41, 41, respectively. The lens frames are further shown disposed angularly and inwardly with respect to the brow bar, whereby the clip members, also shown mounted within connector tubes to the outside upper periphery of the respective lens frames, are shown spatially inward with respect to the brow bar so that when secured to the inside of a wrap around frame the spring action or tension of the frame structure of the assemblies hold and secure the insert assembly within the wrap around frames.

In summary, the clip-in prescription eyewear of the invention provides means for a user's corrective eye lens prescription to be fitted to the inside of any style wrap around frame structure. The clip-in prescription eyewear utilizes a frame with a brow bar and clips or hooks which are deformable and have shape memory and elasticity characteristics to provide adjustable frames for wrap around style frames.

As many changes are possible to the clip-in prescription eyewear embodiments of this invention utilizing the teachings thereof, the descriptions above, and the accompanying drawing should be interpreted in the illustrative and not in the limited sense.

That which is claimed is:

1. An adjustable clip-in prescription lens insert assembly for curved wrap around style frames comprising:
   a) a curved frame having a pair of lens frame members for holding a pair of prescription lenses, each said lens frame member having a top frame portion, an inner frame portion and an outside frame portion, said curved frame having a greater curvature than the curvature of the wrap around style frames;
   b) a connector tube mounted to said inner and outside portion of each said lens frame member;
   c) an adjustable and pliable brow bar structure having a specified configuration and terminal ends fixed in said connector tubes mounted to said frame portions of said pair of lens frame members; and
   d) an adjustable clip member having a specified configuration mounted in said connector tubes mounted on said outside frame portion of said lens frame members and extending over said top portion of each lens frame member, said adjustable clip member extending upwardly and outwardly from said curved frame and having an inwardly directed bend for contact with the wrap around style frames and a formed terminal end for aiding in the positioning of said clip-in prescription lens insert assembly into wrap around style frames, said adjustable clip member further having a coating or a sleeve member, said curvature of said curved frame providing a spring-like mounting to the inside of the curved wrap around style frames.

2. The adjustable clip-in prescription lens insert assembly of claim 1, wherein said brow bar structure is comprised of a deformable shape memory metal composition, whereby said brow bar structure is deformable in the x, y, z directions.

3. The adjustable clip-in prescription lens insert assembly of claim 2, wherein said shape memory metal composition is titanium or a titanium alloy.

4. The adjustable clip-in prescription lens insert assembly of claim 1, wherein said adjustable brow bar structure has a bow shape configuration.

5. The adjustable clip-in prescription lens insert assembly of claim 1, wherein said adjustable clip member is comprised of a titanium or titanium alloy and wherein said coating is a silicone coating.

6. The adjustable clip-in prescription lens insert assembly of claim 1, wherein said clip members have terminal ends to contact the lens of a wrap around frame.

7. The adjustable clip-in prescription lens insert assembly of claim 1, wherein said adjustable clip member extends down said outside frame portion a substantial distance and being constructed for use with 4, 6, and 8 base wrap around frames.

8. An adjustable clip-in prescription lens insert assembly for curved wrap around and like style frames comprising:
   a) a curved frame having a pair of lens frame members for holding a pair of prescription lenses, each said lens frame member having a top, outside and inner frame portion, said curved frame having a greater curvature than the curvature of the wrap around style frames, said pair of lens frame members fully surrounding and holding said pair of prescription lenses;
   b) an adjustable brow bar structure having a specified configuration and having terminal ends fixed to said inner frame portions of said pair of lens frame members, said brow bar structure constructed of a deformable material; and
   c) an adjustable clip member having a predetermined configuration and being attached to said top outside portion of each lens frame member, said adjustable clip member having an inwardly directed bend and a formed terminal end, said adjustable clip member further having a coating or a sleeve member, said curvature of said curved frame providing a spring-like mounting to the inside of the curved wrap around style frames.

9. The adjustable clip-in prescription lens insert assembly of claim 8, wherein connector tubes are fixed to the inside and outside peripheries of each said lens frame member and wherein said adjustable brow bar and said adjustable clip members are mounted in said connector tubes.

10. The adjustable clip-in prescription lens insert assembly of claim 8, wherein said brow bar structure is comprised of a deformable shape memory metal composition.

11. The adjustable clip-in prescription lens insert assembly of claim 10, wherein said deformable shape memory metal composition is titanium or a titanium alloy.

12. The adjustable clip-in prescription lens insert assembly of claim 8, wherein said adjustable brow bar structure has a bow shaped configuration deformable in the x, y, z directions.

13. The adjustable clip-in prescription lens insert assembly of claim 8, wherein said adjustable clip member is constructed of a deformable shape memory metal composition.

14. The adjustable clip-in prescription lens insert assembly of claim 13, wherein said adjustable clip member is comprised of a titanium or titanium alloy and wherein said coating is a silicone coating.

15. An adjustable clip-in prescription lens insert assembly for wrap around style frames having a curved configuration comprising:
   a) a frame having a pair of lens frame members for holding a pair of prescription lenses, each said lens frame member having a top, outside and inner frame portion, said frame having a curved configuration when viewed from the top and having a greater curvature than the curvature of the wrap around style frames to thereby provide a spring-like mounting to the inside of the wrap around style frame;
   b) a deformable brow bar structure having a specified configuration and terminal ends fixed to said inner frame portions of said pair of lens frame members, said deformable brow bar structure comprising a deformable metal composition; and
   c) a single enlarged adjustable clip member having a predetermined configuration extending upward and outward said outside top portion of each lens frame member, said adjustable clip member having a formed terminal end, said adjustable clip member further having a coating or a sleeve member for engaging the wrap around style frame.

16. The adjustable clip-in prescription lens insert assembly of claim 15, wherein connector tubes are mounted to the inside and outside peripheries of each said lens frame member and wherein said adjustable brow bar and said adjustable clip members being mounted respectively within said connector tubes.

17. The adjustable clip-in prescription lens insert assembly of claim 15, wherein said deformable metal composition of said deformable brow bar structure is titanium or a titanium alloy.

18. The adjustable clip-in prescription lens insert assembly of claim 15, wherein said deformable brow bar structure has a configuration deformable in the x, y, z directions.

19. The adjustable clip-in prescription lens insert assembly of claim 15, wherein each said adjustable clip member is constructed of a deformable shape memory metal composition.

20. The adjustable clip-in prescription lens insert assembly of claim 19, wherein said deformable shape memory metal composition is comprised of a titanium or titanium alloy and wherein said coating is a silicone coating.

\* \* \* \* \*